United States Patent [19]

Loreck

[11] 3,895,987
[45] July 22, 1975

[54] IDENTIFICATION PLATE AND METHOD FOR ITS MANUFACTURE

[75] Inventor: Walter Loreck, Wattens, Austria

[73] Assignee: D. Swarovski & Co., Austria

[22] Filed: Aug. 3, 1972

[21] Appl. No.: 277,833

[30] Foreign Application Priority Data
Aug. 4, 1971 Austria .................. 6826/71

[52] U.S. Cl. .............. 156/223; 40/136; 40/200; 40/208; 72/57; 156/303.1; 161/4; 161/5; 161/138; 161/410
[51] Int. Cl. ............................. B32b 31/12
[58] Field of Search ....... 156/63, 67, 219, 220, 228, 156/303.1, 223; 161/3.5, 4, 5, 6, 138, 410; 40/200, 208, 136; 72/57

[56] References Cited
UNITED STATES PATENTS

| | | | |
|---|---|---|---|
| 418,755 | 1/1890 | Schwartz | 40/136 |
| 1,061,059 | 8/1911 | Flock | 156/219 |
| 1,076,519 | 10/1913 | Rodwell | 40/136 |
| 1,080,358 | 12/1913 | Mason | 40/136 |
| 1,924,800 | 8/1933 | Nixon | 40/136 |
| 2,182,919 | 12/1939 | Hainsworth | 40/208 |
| 2,383,884 | 8/1945 | Palmquist | 161/3.5 |
| 2,587,325 | 2/1952 | Husted | 40/208 |
| 3,096,596 | 7/1963 | Magnuson et al. | 161/4 |

*Primary Examiner*—Daniel J. Fritsch
*Attorney, Agent, or Firm*—Toren, McGeady and Stanger

[57] ABSTRACT

An identification plate, such as a license plate for a motor vehicle, comprises identification markings on the front surface of the plate in indented or depressed manner. The indented markings and/or the background surface are reflecting. The background surface and the markings should have different colors.

A method of manufacturing the identification plates is also disclosed.

6 Claims, 4 Drawing Figures in# IDENTIFICATION PLATE AND METHOD FOR ITS MANUFACTURE

FIELD OF INVENTION

The invention is directed to identification plates such as license plates for motor vehicles, wherein the identifying markings and/or the background surface are of reflecting nature so as to render the markings recognizable at night when a light beam strikes the surface of the plate. Although the invention is applicable to reflecting identification plates in general, the invention is particularly useful in connection with motor vehicle license plates and will therefore in the following be described primarily in connection with such license plates.

BACKGROUND AND PRIOR ART

In recent years several countries have permitted and recommended the use of reflecting license plates for motor vehicles. (See, for example, DIN 74,069). For this purpose, certain standards have been set in the various countries. The purpose of using light reflecting license plates is to improve recognition and reading of the identifying markings, i.e., numerals and/or letters on the plates at nighttime, thereby increasing traffic safety.

With the view to avoiding or at least minimizing imitation and counterfeiting of such license plates, the authorities in most countries require that the identifying markings of the license plates are worked into the body of the plate proper by stamping, embossing or the like procedures.

The starting product in the manufacture of non-reflecting license plates is customarily a plate or sheet blank of suitable thickness. This plate or sheet blank is made of metal or, more recently, of a suitable plastic material and usually has a stamped rim or edge portion. The front face of the plate is coated with a color, the colored coating thus constituting the background for the markings. For example, for Germany the plates are coated with a white color while the color for Austria is black. The manufacturer then forms the required markings by stamping from the rear face so that the markings appear on the front face of the coated plates in embossed or raised manner. The embossed or raised areas of the markings are then colored with a different color than the color of the background coating. This is usually accomplished by applying the second color by means of rollers or the like.

Retroreflecting license plates are manufactured in analogous manner. However, the front face of the plate or sheet is in this case coated or covered with a light reflecting material or substance. When the raised or embossed areas of the markings are to be colored, the reflecting material is covered or coated at these areas so that the markings during nighttime and upon reflection appear black while the background, by contrast, appears brightly luminescent.

Such embodiments of retroreflecting license plates are thus limited to countries which prescribe dark markings on a light background surface.

The production of retroreflecting license plates is fraught with difficulties if the markings must be white while the background surface has to be black. Such requirements exist, for example, in Austria, Italy, England and France. In order to produce reflecting license plates in accordance with the requirements or standards of these countries, the reflecting markings must thus appear on a black background surface. If such license plates were to be produced analogously to the procedure herein above described, the front surface of the initial plate blank would have to be coated in its entirety with reflecting material and the markings would then have to be stamped in recessed or indented manner, whereafter the unstamped background surface would have to be colored black by roller application or the like. The depressed or recessed markings would then remain white and reflecting. This procedure, however, is highly uneconomical. This is so because the predominant portion of the reflecting material which initially has to be applied to the starting plate or sheet would then have to be covered by the color, to wit, black, in which the background surface is to appear. This, of course, is a waste of material. Further, in addition to being uneconomical, this type of license plate has a significant technical drawback. Thus, if due to mechanical or other reasons, the coating color which covers the initially reflecting background surface is scratched or peels off, the subjacent reflecting material would again be exposed. While this defect does not have any substantial bearing during daytime conditions, it is, of course, highly disadvantageous during nighttime, since the exposed reflecting material causes reflections, thereby interfering with the reflection of the reflecting markings. If a larger portion of the reflecting material on the background surface is thus exposed, the very purpose of providing reflecting markings would thus be defeated.

In some countries, such as, for example, France and Great Britain, in which, as in Austria, white markings on black background surface were originally prescribed, it has, therefore, recently been decided to permit reflecting license plates which have the reverse arrangement, to wit, black markings on white background surface. The result of this decision is thus that in these countries the previous status of uniform license plates conveying a uniform identification image has been abandoned and two types of plates, wherein background surface and markings appear in reversed colors, have to be contented with.

It has also been proposed to manufacture license plates with embossed white colored markings and to cover the raised surfaces of such markings subsequently with reflecting material, for example, by adhesively adhering reflecting sheet material to the marking surfaces. The markings which are thus rendered reflecting may then be coated with a protective lacquer or varnish or the like.

This last mentioned construction has also substantial drawbacks. To start with, after the stamping which forms the embossed markings, three additional working steps have to be carried out, to wit, coloring the raised or embossed markings with white color, adhesively connecting to the markings reflecting material and coating of the reflecting markings with lacquer or varnish to protect the edge portions of the markings. In addition, of course, it is disadvantageous that the reflecting material is applied to exposed areas, to wit, at the raised surfaces of the markings. This is so because the exposed reflecting material is easily damaged by mechanical action.

SUMMARY OF THE INVENTION

It is the primary object of the present invention to overcome the drawbacks and disadvantages of the prior art license plate constructions as described herein above and to provide reflecting license plates which are superior and readily manufactured at low expense.

Generally, it is an object of the invention to simplify and improve on the production of reflecting license plates.

Briefly and in accordance with the invention, a license plate is provided with identifying markings which are indented or depressed relative to the surface plane of the plate proper. The indented or depressed markings are preferably reflecting, while the background surface is non-reflecting and appears dark when the license plate is struck by a light beam. However, it is also within the scope of this invention to provide license plates wherein both the depressed markings and the background surface are reflecting, the color of the markings, however, being different from that of the background. Further, it is possible to produce plates wherein the background is reflecting while the depressed markings are non-reflective.

As compared to the prior art constructions as discussed above, the inventive license plate has many important advantages. To start with the reflecting material is used in economical manner and no waste takes place since, in the preferred embodiments only those surfaces which in the final license plate are intended to be reflecting are provided with reflecting material. Moreover, the subsequent covering or coating of initially provided reflecting surfaces with color is eliminated. After the starting plate or sheet blank has been provided with the depressed or indented markings, which may be accomplished in any suitable manner as, for example, by stamping, the reflecting material is applied to the recessed markings only and the license plate is ready for use. Subsequent application of covering color, for example, by roller application, is thus eliminated.

Since in the inventive construction the surfaces of the markings are depressed or recessed relative to the surface plane of the plate proper, the reflecting material or substance which is applied to the surfaces of the markings is protected, in optimum manner, against mechanical and the like influences. Even if the non-reflecting background surface of the license plate is damaged, such as by scratching or the like, no reflecting material is exposed and thus no interference with the retroreflection of the markings proper during nighttime takes place.

The inventive construction renders it also possible to produce, in exceedingly simple manner, identification plates, such as license plates, wherein both the markings and also the background surface have retroreflecting characteristics. Such a construction is, for example, of importance for the production of identification plates which require white reflecting markings on a blue background surface as required, for example, in Austria for identification plates used for test travel.

The production of the inventive license plates is particularly simple and economical if the stamping and the application of the reflecting markings is combined into a single procedure. This can be accomplished in exceedingly simple manner by placing pressure adhesives marking blanks, prior to the stamping procedure, onto the stamping or punching tool. Thus, for example, if the numeral 5 is to be stamped in recessed position into the starting plate or sheet, a reflecting sheet material having an adhesive rear surface may be cut to the configuration of the numeral 5 whereupon the cut-out blank is placed on the stamping tool with the adhesive surface facing away from the tool. When the stamping of the numeral 5 is effected by the tool, the adhesive surface of the reflecting blank is then simultaneously adhered to the depressed surface of the starting plate and upon removal of the stamping tool the reflecting surface of the numeral 5 blank is then exposed. Of course, if a series of markings are to be simultaneously applied to the starting plate and all the markings are simultaneously effected by a suitably shaped stamping templet, a sheet of reflecting material may be interposed between the templet and the starting plate, whereby the reflecting sheet will be properly positioned, cut and adhered to during the stamping procedure. However, it is, of course, also possible first to effect the stamping and thereafter to apply the reflecting material to the stamped, indented markings. Thus, for example, it is feasible to impart the indented markings with reflecting characteristics by spray painting with a reflecting color, while masking the unstamped portions of the front face of the plate.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

Figure 1:
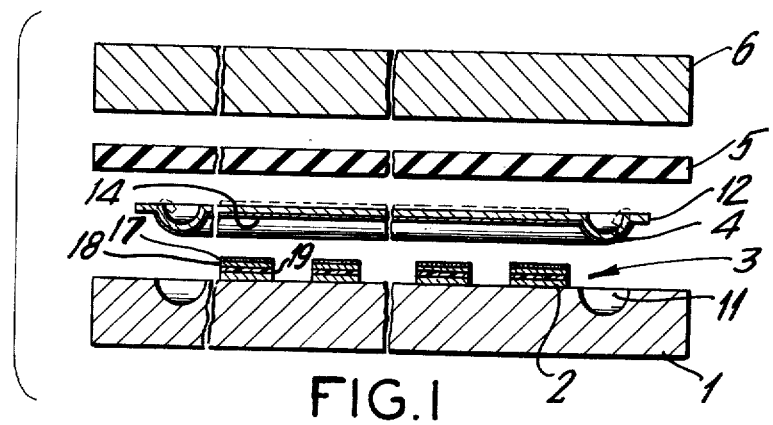
FIG. 1 is an exploded view of an assembly for producing one embodiment of an inventive license plate, illustrating the operational procedure.

Turning first to FIG. 1, the license plate may be prepared as follows: a metallic support block 1 of, for example, about 3 cm thickness is used which has a circumferential cut-out or groove 11. Metallic stamping tools or templets 2 are placed on the top face of the block 1. These stamping templets have a height of about 1 mm and an outline corresponding to the identifying markings to be stamped into the license plate. Thus, the stamping templets 2 may be letters or numerals. In order to facilitate the positioning of the stamping templets 2 on the top surface of the metal block 1, the templets may be made of magnetic material. Reflecting sheet blanks are then cut or stamped from reflecting sheet material in a configuration or outline corresponding to the outline of the stamping templets. Thus, for example, if the left-hand stamping templet, as seen in FIG. 1, has the outline of the letter T, a reflecting blank of complementary outline is placed on top of the templet. The reflecting blanks which thus are made of paper or plastic material have an adhesive face and a reflecting face, the reflecting face being supported by the top face of the templets while the adhesive face points upwardly and away from the templets. This is shown in FIG. 1 wherein the reflecting blanks 3 are indicated to be in alignment with the metal templets 2. In order to prevent displacement of the reflecting blanks 3, which thus have the outline of letters and numerals, relative to the metal templets 2, a drop of water soluble adhesive may be interposed between the templets and the reflecting blanks.

Figure 2:
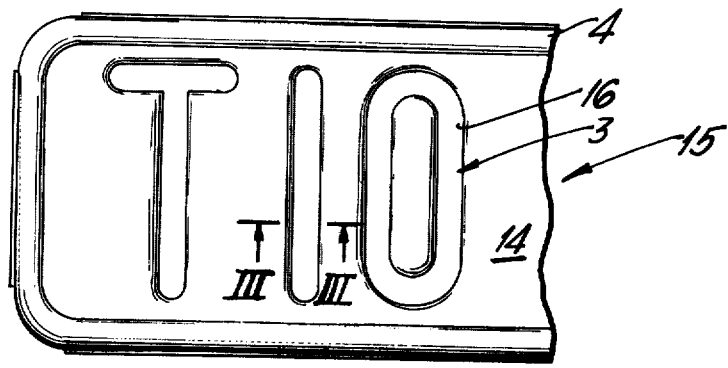
FIG. 2 is a front elevational view on an inventive license plate.

The next member of the assembly is the license plate blank 12 which is to be stamped with the desired markings. The license plate blank 12 is of metal or plastic and has a circumferential stamped rim or edge portion 4 which fits into the cut-out or groove 11 of the support block. When the plate blank 12 is placed on the support block, positioning of the plate blank 12 relative to the support block 1 is thus greatly facilitated by the complementarily shaped members 4 and 11, thereby preventing displacement of the plate blank 12 relative to the support block 1. When the plate blank 12 is placed on the support block 1, the templets 2 and the reflecting blanks 3 thus are interposed between the block 1 and the plate 12. A resilient pressure transfer member 5, which may be in the form of a rubber layer, is now placed on the plate blank 12, the rubber layer, for example, having a thickness of about 1 cm. Finally, the pressure member 6 in the form of a metal plate of a thickness of about 3 cm is placed on the rubber layer. The entire assembly is then inserted into a press and subjected to high pressure. The magnitude of the pressure depends to a very large extent on the specific plate blank material which is being used and also on the desired stamping depths as well as on the hardness of the rubber layer. During the compression the metal templets 2 form indented or depressed markings in the front face of the plate blank 12 while the adhesive exposed face of the reflecting blanks 3 is adhesively adhered to the depressed areas of the markings. The product thus obtained is a finished license plate as seen in FIG. 2. The license plate, generally indicated by reference numeral 15 of FIG. 2, shows the markings 16 which have been formed by the metal templets 2 and which are covered with the reflecting material of the reflecting blanks 3. The circumferential stamped portion 4 which, during manufacture, fits into the groove 11 of the support block 1, is also visible in FIG. 2. While the markings of the license plate of FIG. 2 are reflecting, the background surface which thus is formed by the remaining portion of the front surface of the plate is non-reflecting. In the particular embodiment here shown this non-reflecting background surface is colored by the color black, the black color, indicated by reference numeral 14, forming a coat on the license plate 15. From a practical point of view it is advantageous if the initial plate blank 12 is supplied to the manufacturing process with the entire front surface coated with the respective color such as, for example, the color black.

Figure 3:
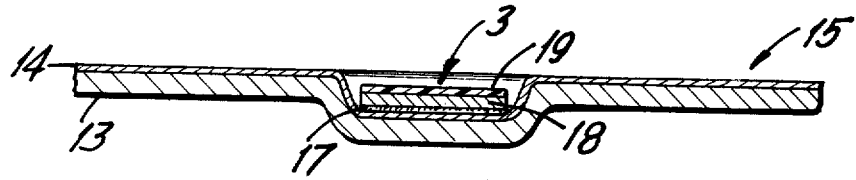
FIG. 3 is a section along lines III—III of FIG. 2.

FIG. 3 shows on somewhat enlarged scale a cross section of the various layers forming the license plate of FIG. 2. Thus, the metallic or plastic body portion of the license plate is indicated by reference numerals 13, numeral 14 indicating the color coat covering the front surface of the license plate. The reflecting marking composed of the adhesive 17, the sheet material proper 18 and the reflecting coating 19 is clearly seen within the indented or depressed body portion of the plate.

Figure 4:
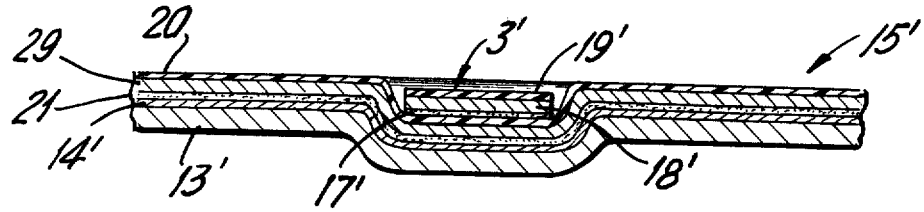
FIG. 4 is a sectional view of a second embodiment of an inventive license plate.

FIG. 4 is a cross sectional view of a second embodiment wherein like parts are indicated by the same reference numerals which, however, have been amplified by a prime. The difference between the embodiments of FIGS. 3 and 4 is that the paint layer 14' is, in turn, covered by a reflecting sheet 19 having a reflecting top surface 20 and an adhesive face 21, the adhesive face 21 being adhesively connected to the paint layer 14'. The depressed markings may, in this case, be reflecting or non-reflecting. In any event, they should be of a different color than the color of the reflecting material covering the unstamped portions of the license plate. A license plate according to FIG. 4 may be produced in the same manner as explained in connection with FIG. 1 with the sole difference that the front face of the plate blank 12 should be coated with reflecting material prior to being placed on the support block 1 so that the blanks 3 will be superimposed on the reflecting material of the blank 12. If the markings are to be non-reflecting, then blanks 3 of non-reflecting material are supplied.

What is claimed is:

1. A method for producing an identification plate assembly, such as a motor vehicle license plate, utilizing a blank plate upon which indicia is applied, said method comprising the steps of providing a pair of pressure members between which said assembly may be formed by application of a compressive force thereto, positioning upon one of said pressure members at least one templet member consisting of rigid material and being shaped in the form of said indicia to be produced upon said identification plate assembly, applying over said templet member indicia sheet material having a first side adapted to be viewed during use of said identification plate assembly and a second side opposite said first side, said indicia sheet material having a configuration conforming to the shape of said templet and being applied thereon with said first side against said templet, applying said blank plate over said templet and indicia sheet with said second side of said indicia sheet in contact with said blank plate, applying a resilient pressure sheet over said blank plate and compressing the assembly thus formed between said pair of pressure members to simultaneously cause said blank plate to be indented in the form of said templet members while said indicia sheet material is adhered to said blank plate along said indentations.

2. The method according to claim 1 wherein said indicia sheet material comprises an adhesive substance on said second side thereof.

3. A method according to claim 1 wherein said pressure sheet includes a resilient pressure transfer layer facing said identification plate blank.

4. The method according to claim 1 wherein said first side of said indicia sheet material comprises reflective material.

5. The method according to claim 1 including the further step of applying a coating of a reflective material to the surface of said blank plate prior to placing said surface in contact with said second side of said indicia sheet material.

6. The method according to claim 5 wherein said first side of said indicia sheet material comprises a material which is relatively non-reflecting as compared with said coating of reflective material applied to said blank plate.

* * * * *

UNITED STATES PATENT OFFICE
CERTIFICATE OF CORRECTION

Patent No. 3,895,987    Dated  July 22, 1975

Inventor(s) Walter Loreck

It is certified that error appears in the above-identified patent and that said Letters Patent are hereby corrected as shown below:

Item [73] should read as follows:

-- Assignee : D.Swarovski & Co.,Glasschleiferei
    Wattens,Tirol, Austria.--

Signed and Sealed this twentieth Day of January 1976

[SEAL]

Attest:

RUTH C. MASON
*Attesting Officer*

C. MARSHALL DANN
*Commissioner of Patents and Trademarks*